United States Patent [19]
Mori

[11] Patent Number: 4,690,490
[45] Date of Patent: Sep. 1, 1987

[54] LIGHT DIVERTING DEVICE

[76] Inventor: Kei Mori, 3-16-3-501, Kaminoge, Setagaya-ku, Tokyo, Japan

[21] Appl. No.: 653,983

[22] Filed: Sep. 24, 1984

[30] Foreign Application Priority Data

Sep. 27, 1983 [JP] Japan ................................. 58-178718
Nov. 16, 1983 [JP] Japan ................................. 58-215809

[51] Int. Cl.$^4$ ................................................. G02B 6/28
[52] U.S. Cl. ................................. 350/96.15; 350/96.10
[58] Field of Search ................ 350/96.10, 96.15, 96.16

[56] References Cited

U.S. PATENT DOCUMENTS

| | | | |
|---|---|---|---|
| 3,365,568 | 1/1968 | Germen | 350/96.15 |
| 4,172,631 | 10/1979 | Yevick | 350/96.15 X |
| 4,176,908 | 12/1979 | Wagner | 350/96.15 |
| 4,575,180 | 3/1986 | Chang | 350/96.15 |
| 4,576,436 | 3/1986 | Daniel | 350/173 X |

*Primary Examiner*—William L. Sikes
*Assistant Examiner*—Akm E. Ullah
*Attorney, Agent, or Firm*—Jordan and Hamburg

[57] ABSTRACT

A light diverting device for diverting a part of the light energy transmitted through an optical conductor and for taking it out of the optical conductor. The device is comprised of a first cylindrical optical conductor provided with a light emission edge surface formed on an inclined plane, a second optical conductor provided with a light-receiving edge surface having an inclined surface engaged with the inclined surface of the first one with a circular hole formed on a portion thereof and a third optical conductor having a light-receiving edge formed on the outer circumferential surface of the first optical conductor at a position opposed to said hole.

14 Claims, 18 Drawing Figures

LIGHT DIVERTING DEVICE

BACKGROUND OF THE INVENTION

The present invention relates to a light diverting device for diverting a part of the light energy transmitted through an optical conductor and for picking it up outside of the optical conductor.

The present applicant has previously proposed various methods of focusing solar rays or artifical rays by the use of lenses or the like and by guiding those rays into an optical conductor and by further transmitting them through the optical conductor onto an optional desired place for use in illumination, etc.

In such cases, however, if the light energy transmitted through the optical conductor can be diverted and taken out therefrom at about the half way mark of said transmission route, it might be possible to considerably improve the utilization of the light energy. Conventionally, such a light diverting means didn't exist so that it was less useful to use an optical device as first mentioned heretofore.

SUMMARY OF THE INVENTION

It is therefore an object of the present invention to provide a light diverting device capable of effectively diverting and picking up outside of the optical conductor a part of the light energy transmitted through it.

It is another object of the present invention to provide a light diverting device connected in cascade between a transparent cylindrical optical conductor at its light source side and another transparent cylindrical optical conductor at its light emission side for diverting and picking up a part of the light transmitted through it.

It is another object of the present invention to provide a light diverting device in which the light energy can be effectively diverted and which can be manufactured easily.

It is another object of the present invention to provide a light diverting device which is comprised of a first cylindrical optical conductor provided with a light-emission edge surface formed on an inclined surface, a second optical conductor provided with a light-receiving edge surface having an inclined surface engaged with said first inclined surface and having a circular hole formed on a portion thereof and a third optical conductor having a light-recieving edge formed on the outer circumferential surface of said first optical conductor at a position opposed to said hole.

BRIEF DESCRIPTION OF THE DRAWINGS:

FIGS. 5(a), 5(b) through 9 are views showing light diverting members used in the embodiments various of the present invention respectively.

FIG. 14 is a view showing an example of an optical conductor for use in the light diverting device shown in FIG. 12.

DESCRIPTION OF THE PREFERRED EMBODIMENTS

Figure 1:
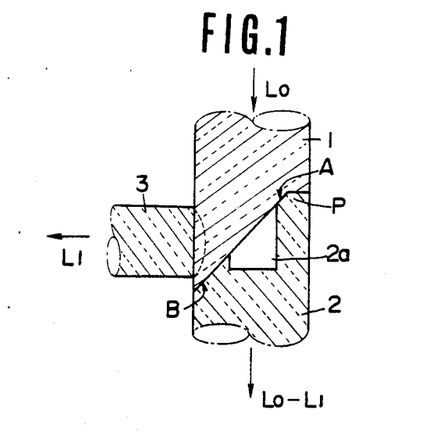
FIGS. 1 and 2 are cross-sectional views of the main body's construction for explaining one embodiment of a light diverting device according to the present invention.

FIG. 1 is a cross-sectional view of the construction for explaining an embodiment of a light diverting device according to the present invention. In FIG. 1, 1 is a first cylindrical optical conductor, 2 is a second cylindrical optical conductor, and 3 is a third cylindrical optical conductor.

The light emitting edge surface A of the first optical conductor 1 is formed on an inclined plane and the light receiving edge surface B of the second optical conductor 2 has an inclined surface engaged with the edge surface of A and it further has a circular grooved hole 2a at the central portion thereof. The third optical conductor 3 is so installed that the light receiving edge is situated on the outer circumferential surface of the first optical conductor 1 at a position opposed to the hole 2a.

Consequently, a part $L_1$ of the light energies $L_0$, transmitted through the optical conductor 1, is reflected on a reflecting surface corresponding to the hole portion 2a of the optical conductor 1 and diverted into the third optical conductor 3 while remaining light energy $L_0 - L_1$ is transmitted through the second optical conductor 2.

Since the amount (intensity) of the diverted light is related to the square measure of hole 2a, the square measure of hole 2a may be allowed to be changed in accordance with the diverted light intensity to be required. For instance, when one fourth ($\frac{1}{4}$) of the light energy $L_0$ transmitted through the first optical conductor 1 needs to be diverted and taken out therefrom, the square measure of the hole 2a may be allowed to be one fourth ($\frac{1}{4}$) of the first optical conductor's square measure.

Figure 2:
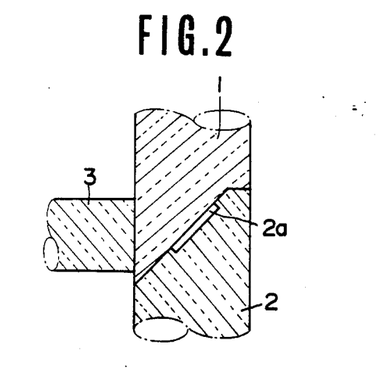

Moreover, the inclined surfaces of the first optical conductor 1 and of the second optical conductor 2 are connected with each other by use of optical paste, optical gel, or optical matching oil. In such a case, if the inclined surfaces of both optical conductors are formed on the uneven (concave-convex) portions that are engaged with each other supplementarily as shown by P in FIG. 1, the work of positioning (matching) the center can be easily done at the time of connection. Consequently it is clear that hole 2a is bored in a direction parallel to the shaft of the optical conductor 2 as shown in FIG. 1, but hole 2a may be allowed to be bored in another direction perpendicular to the inclined surface as shown in FIG. 2.

Figure 3:
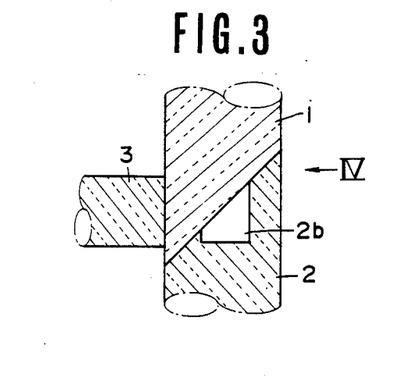
FIG. 3 is a cross-sectional view of the main body's construction for explaining another embodiment of the present invention.
Figure 4:
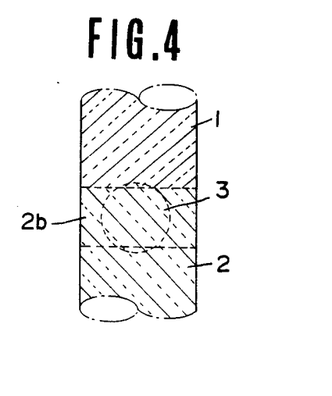
FIG. 4 is a side view of FIG. 3 as seen from the direction of arrow IV in FIG. 3.

FIG. 3 is a cross-sectional view of the construction for explaining another embodiment of the present invention. FIG. 4 is a side view of FIG. 3 as seen from the direction of the arrow IV in FIG. 3. In these figures, the same reference numeral is attached to the portions performing the same action as that of FIGS. 1 and 2.

Further, in the third embodiment of FIGS. 3 and 4, as mentioned above, a groove 2b is provided on the inclined surface of the second optical conductor 2 in a direction parallel to the shaft of the optical conductor. A fourth optical conductor 4 as shown in FIG. 5 can be removably installed in the groove 2b.

Figure 5A:
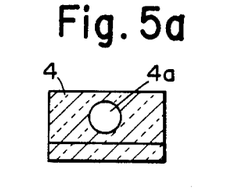
Figure 5B:
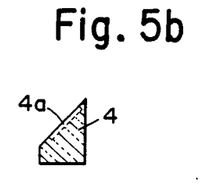

FIGS. 5(a) and 5(b) are views showing an example of the fourth optical conductor 4. FIG. 5(a) is a front view thereof and FIG. 5(b) is a side view thereof. In the embodiment shown in FIG. 5, a circular notched groove 4a is provided at an approximate central portion on the inclined surface side of the fourth optical conductor 4 the circular groove 4a having its axis disposed perpendicular to the inclined plane similar to that shown in FIG. 2.

Consequently if the fourth optical conductor 4 is installed in the groove 2b, a part of the light energy transmitted through the first optical conductor 1 is reflected on the groove portion 4a and guided into the third optical conductor 3 as is the case in the embodiment previously mentioned. In such a case, the square measure of the groove 4a may be changed in order to change the amount of diverted light. Therefore, for example, a plurality of fourth optical conductors having grooves 4a of different square measures are provided, and one optical conductor having a groove of a desired square measure can be selected from among them and employed in the light diverting device.

Figure 6A:
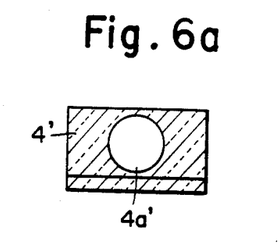
Figure 6B:
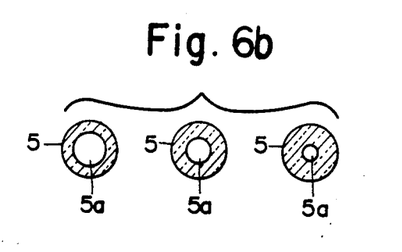

Otherwise, a fourth optical conductor 4' having a comparatively large grooved square measure 4a as shown in FIG. 6(a) is provided, and in addition to that, a plurality of fifth optical conductors 5 having a groove or hole 5a bored therein as shown in FIG. 6(b) is provided, the outer circumferential surfaces of which are engaged with the groove 4a' of the above-mentioned fourth optical conductor 4' respectively. The square measures of the respective holes 5a bored in the respective optical conductors 5 are different from each other. An optical conductor having a groove or hole 5a corresponding to a desired amount of the diverted light may be selected among those optical conductors 5 and engaged with a groove or hole 4a' of the fourth optical conductor 4', and afterward the fourth optical conductor 4' may be installed in the afore-mentioned through hole 2b.

Furthermore, in the case of employing a fifth optical conductor as previously described, the shape of the groove 4a' of the fourth optical conductor 4' as mentioned above may be optional, as for example a four-cornered (square) one. On that occasion, the external form of the fifth optical conductor 5 may be, for example a four-cornered one so as to fit into the groove's form for the fourth optical conductor 4'.

Figure 7A:
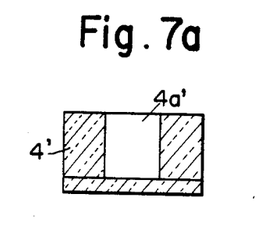
Figure 7B:
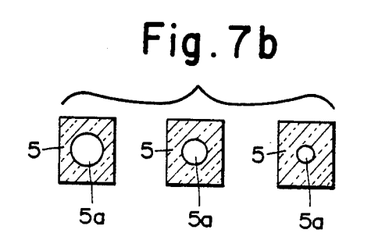

FIGS. 7(a) and 7(b) are views showing an example of such a case. FIG. 7(a) is a front view of the above-mentioned fourth optical conductor 4'. As shown in FIG. 7(a), for instance, a four-cornered groove 4a' is provided therein. In the groove 4a', there is provided a fifth optical conductor 5 as shown in FIG. 7(b). The external form of the fifth optical conductor 5 coincides with the groove 4a' of the fourth optical conductor, and the fifth optical conductor 5 has a circular groove 5a in its internal portion.

Figure 8:
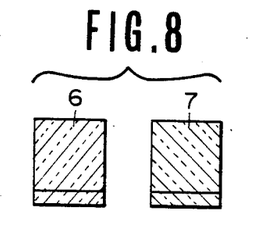

FIG. 8 is a view showing another embodiment of the present invention. This embodiment includes two optical conductors 6 and 7 installed in a series in groove 2b as shown in FIGS. 3 and 4, and both of them are inserted into groove 2b from both edge (end) portions respectively.

Consequently, when both of the optical conductors 6 and 7 are inserted so as to let the inserted edge surface of the optical conductor 6 coincide with that of optical conductor 7, all of the light energy from the first optical conductor is transmitted to the second optical conductor 2. If a gap-space is provided between both of the inserted edge surfaces, a certain amount of light energy corresponding to the square measure of the gap-space is guided into the third optical conductor 3.

Figure 9:
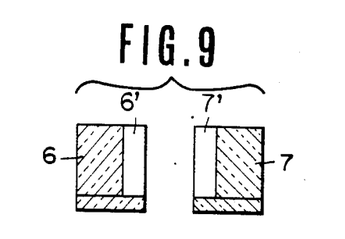

FIG. 9 is a front view showing a modification of the embodiment shown in FIG. 8. In this modified embodiment, notches 6' and 7' are provided on the inclined surfaces of the edges to be inserted into the afore-mentioned optical conductors 6 and 7. In such a manner, the optical conductor 5 as shown in FIG. 7(b) is installed and used between both notches 6' and 7'.

Figure 10:
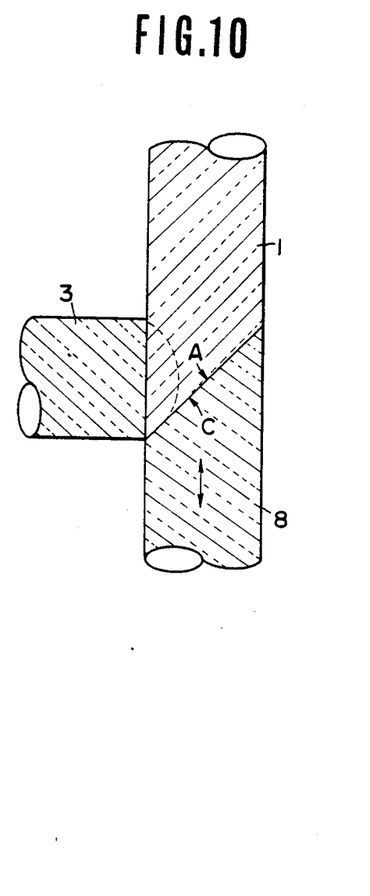
FIG. 10 is a view showing an example of the light diverting device's construction at the final stages thereof.

FIG. 10 is a view for showing an example of the light diverting device's construction at the final stage thereof. In FIG. 10, 1 is a cylindrical optical conductor at the light source side, 3 is a cylindrical optical conductor at the light diverting side, and 8 is an optical conductor for diverting and controlling the light.

As shown in FIG. 10, the final edge surface A of the optical conductor 1 at the light source side is formed on an inclined surface, and a third optical conductor 3 at the light diverting side, having a diameter equal to or a little larger than that of the optical conductor 1 at the light source side, is installed opposite to the inclined surface and is perpendicular to it. It follows that the optical conductor 8 for diverting and controlling the light has an inclined surface C engaged with the inclined surface A of the optical conductor 1 at the light source side. The inclined surface C is constructed so as to be able to be removed from the inclined surface A of the first optical conductor 1.

Consequently when the inclined surface of the optical conductor 8 for diverting and controlling the light is separated from the inclined surface of the optical conductor 1, the light transmitted through optical conductor 1 is reflected at the inclined surface A and guided into optical conductor 3. On the other hand, when the inclined surface of optical conductor 8 for diverting and controlling the light is engaged with the inclined surface of optical conductor 1, the light transmitted through optical conductor 1 is guided into conductor 8 for diverting and controlling the light. The light diverting device shown in FIG. 10 can also be used as a light switching device.

Furthermore, it might be possible to use the light diverting device as a corner for guiding all of the lights from optical conductor 1 into optical conductor 3 while the optical conductor for diverting and controlling the light is omitted. In such a case aluminum or the like is evaporated on an area near the connecting portion of optical conductors 1 and 3 having an inclined surface, and the outer circumferential surface of the corner portion is used as a reflecting surface so that the direction of the light's propagation can be much more effectively made perpendicular thereto.

Figure 11:
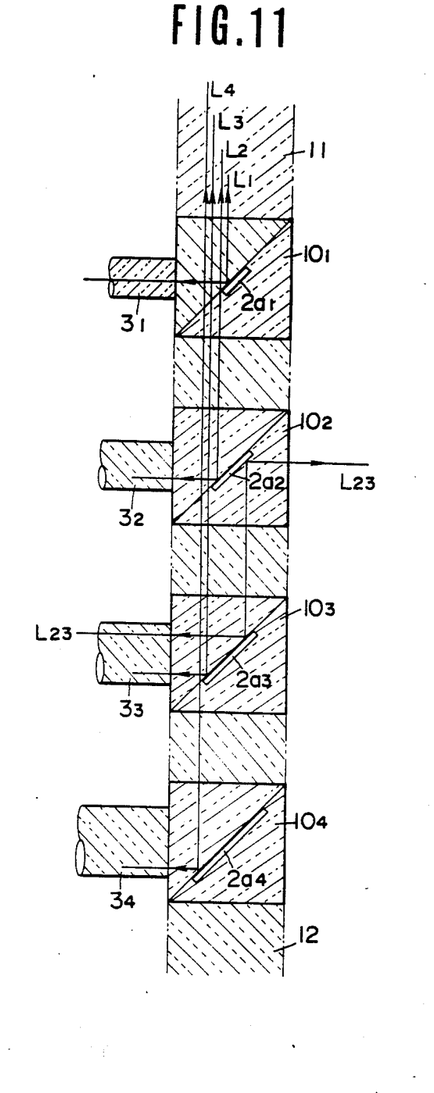
FIG. 11 is a view showing the use of the light diverting device according to the present invention.

FIG. 11 is a view for showing the construction in which a plurality of light diverting devices as mentioned above are connected in cascade with each other and installed on an optional desired place. In FIG. 11, $10_1$, $10_2$, $10_3$, and $10_4$ are light diverting devices as mentioned before. 11 is an optical conductor at the light source side, and 12 is an optical conductor at the light emission side. FIG. 11 shows an example of connecting four light diverting devices with each other. The number of light diverting devices desired is optional.

However, in the case of installing the light diverting devices in such a manner, if the light energy is diverted at the upstream side, the density of the light energy at the downstream side decreases and therefore the amount (intensity) of the diverted light at the downstream side is less. In order to avoid such a problem, the square measure of groove 2a (or 4a or 5a) may be increased 'in order' going toward the downstream side thereof.

As shown in FIG. 11, if four light diverting devices are used, the square measure of the groove of the first most upstream side may be one fourth ($\frac{1}{4}$) of that of the optical conductor 1, that of the second may be one third ($\frac{1}{3}$), and that of the third may be one half ($\frac{1}{2}$). In general the square measure of the groove of the most upstream side may be $1/n$ of that of the optical conductor 1, that of the second may be $1/n-1$, that of the third may be $1/n-2$, and that of the following may be increased in a similar order. Finally, the square measure of the groove of the last n-th side may be $1/n-(n-1)=1$. In such a manner, when all of the light diverting devices are employed, light of approximately equal amounts or intensity ($1/n$) is diverted from all of them respectively.

Furthermore, in FIG. 11, $L_1$ through $L_4$ are lights for use in communication, for example laser beam lights. As an example, in FIG. 11, if the edge portion of the optical conductor 11, not shown in the figure, is connected with a solar ray collecting device equipped on a rooftop or the like of a building and the diverting optical conductors $3_1$, $3_2$, $3_3$, and $3_4$ are used for illuminating the fourth floor, the third floor, the second floor, and the first floor, respectively, it may be possible to communicate between the rooftop and the respective floors as shown by the light beams $L_1$ through $L_4$. Furthermore, light communication between the second and the third floors can be performed as shown by light beam $L_{23}$.

Figure 12:
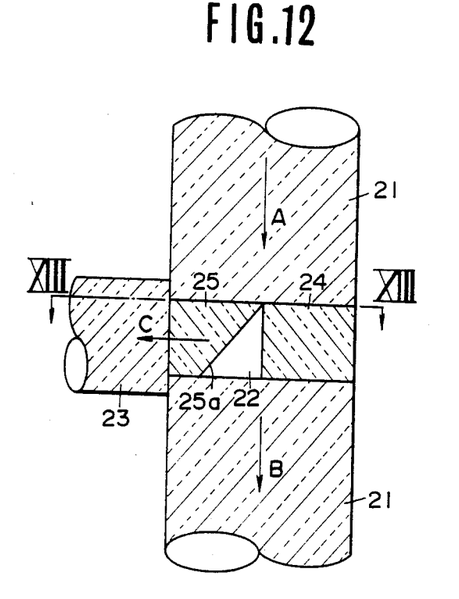
FIG. 12 is a side view for explaining another embodiment of the light diverting device according to the present invention.
Figure 13:
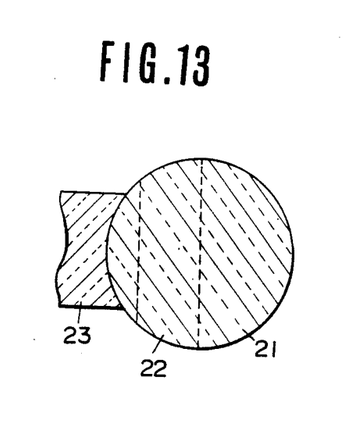
FIG. 13 is a cross-sectional view taken along the section line XIII—XIII in FIG. 12.

FIG. 12 is a front view for explaining another embodiment of the light diverting device according to the present invention. FIG. 13 is a cross-sectional view taken along section line XII—XII of FIG. 12. In FIG. 12, 21 is a first optical conductor rod and a through hole 22 is provided in the optical conductor rod 21 in the direction of the radius thereof. A surface 25a of the through hole 22 has a certain inclination with respect to the direction of the axis of the optical rod 21 as shown in FIG. 12. A second optical conductor rod is represented by the numeral 23. On the outer circumferential portion of the first optical conductor, rod 21 is fixedly mounted to the third optical conductor rod 23 at a position opposed to the inclined surface 25a of the through hole 22.

However, it is difficult to provide a hole in optical rod 21 so as to have an inclined surface 25a therein. Therefore, in practice, the same optical conductor rod as optical conductor rod 21 is cut in round slices of desired thicknesses and the optical conductor is cut in such a manner as to be divided into two portions through the center thereof. A portion of the separated optical conductor is represented by optical conductor 24 as it is, and another portion of the separated optical conductor having a cut cross-section formed as the inclined surface 25a is represented by optical conductor 25. These portions of the optical conductor are tightly fixed onto the optical conductor rods, numbered 21 respectively, by the use of an adhesive like optical paste, etc. and a hole 22 is formed through as shown in FIGS. 12 and 13.

Figures 14A, 14B, 15:
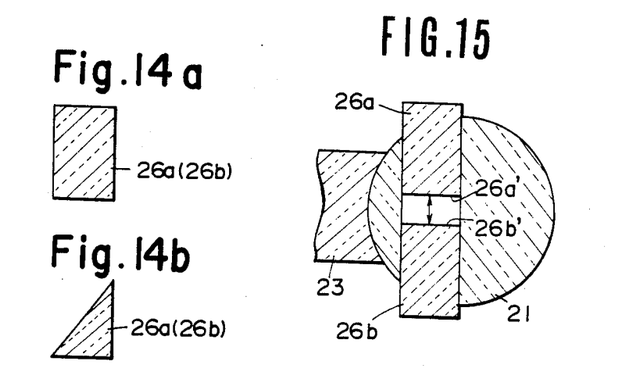
FIG. 15 is a cross-sectional view showing an application of the light diverting device according to the present invention.

FIGS. 14(a) and 14(b) show an example of how an optical conductor is tightly inserted into hole 22. In those figures, (a) is a plane view and (b) is a side view of the inserted optical conductor. In practice, at least two of such optical conductors 26 are prepared, and those optical conductors are inserted into the hole 22 from both sides thereof as shown by numbers 26a and 26b in FIG. 15.

On that occasion, however, when those optical conductors 26a and 26b are inserted into the hole 22 so as to let the inserted side (edge) surfaces 26a' and 26b' of the optical conductors coincide with each other, all of the lights transmitted in the direction shown by arrow A through the optical conductor rod 21 are transmitted in the direction shown by arrow B. When a gap space l is provided between both of the inserted edge surfaces of 26a' and 26b', a part of the light transmitted from direction A is reflected at the place (surface) corresponding to the gap-space, and it is transmitted in the direction as shown by arrow C through the optical conductor rod 23 and then taken out therefrom.

Furthermore, the amount of the light taken out from the optical conductor rod 23 can be adjusted by changing the gap l, that is, of the inserted portions of the optical conductors 26a and 26b. Still further, on that occasion, if the air contained in the gap-space of the gap l does not come out into the open air, it may be impossible to bring the edge surfaces, 26a' and 26b', of the optical conductors 26a and 26b into close contact with each other. In order to avoid such a problem, a non-illustrated fine hole is preferably opened in the direction of their axes, in either one of the optical conductors 26a and 26b or in both of them.

Figure 16:
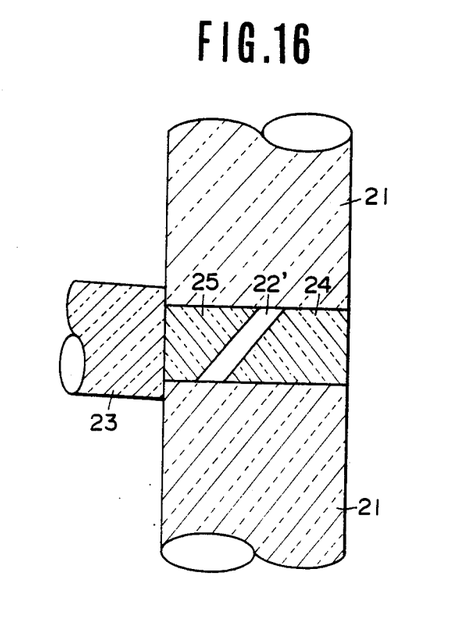
FIG. 16 is a side view showing another embodiment of the present invention.
Figure 17:
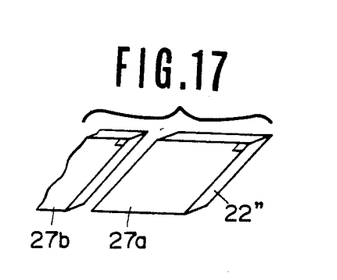
FIGS. 17 and 18 are views showing examples of preferred optical conductors for use in light diverting devices of the type shown in the embodiment of FIG. 16.

FIG. 16 is a front view for explaining another embodiment of the light diverting device according to the present invention. In FIG. 16, a hole 22 is formed in the shape of a parallelogram as shown in FIG. 16 and inside the hole 22' optical conductors 27a and 27b are provided having parallelogram surfaces 22'' that match the inner surface of the hole 22' as shown in FIG. 17. Those optical conductors 27a and 27b can be removably inserted into the hole 22' in the same manner as in the case of optical conductors 26a and 26b.

Figure 18:
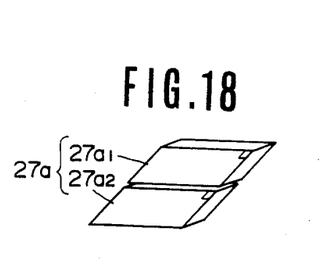

In the afore-mentioned embodiment, only one arrangement employing a couple of optical conductors 26a and 26b, or 27a and 27b, is described. However, it may be possible to further divide optical conductors 26a and 26b, or 27a and 27b, into several sections as shown in FIG. 18. Optical conductor 27b is omitted in FIG. 18 because it is completely of the same construction as optical conductor 27a. The optical conductors divided in the same manner are represented by $27a_1$ and $27a_2$, respectively. Both of them can be employed for obtaining the same performance as that of the afore-mentioned single optical conductor 27a.

What is claimed is:

1. A light diverting device comprising a first cylindrical optical conductor means having a longitudinal axis, said first conductor means having a first light-emission end surface which is inclined relative to said longitudinal axis, a second cylindrical optical conductor means having a longitudinal axis axially aligned with the longitudinal axis of the first conductor means, said second conductor means having a second light-receiving end surface which is inclined relative to the longitudinal axis of said second conductor means, said first inclined surface engaging said second inclined surface, said second conductor means having a receiving-passage opening up onto said second inclined surface, third optical conductor means disposed in said receiving-passage, said third optical conductor means having an opening means which defines a hole in said second inclined surface, a fourth optical conductor means having a longitudinal axis which is disposed transversely to the longitudinal axis of said first conductor means, said fourth conductor means having a light-receiving edge which conforms to and engages the outer cylindrical surface of said first conductor means at a position opposite to said hole such that light energy transmitted through the first conductor means is partially diverted by a first portion of said first inclined surface opposite to said hole into said fourth conductor means, the remaining light energy transmitted through the first conductor means being transmitted through said second conductor means, said third optical conductor means providing for changing the size of said hole to thereby change the amount of light energy diverted into said fourth optical conductor means.

2. A light diverting device according to claim 1, wherein said hole is a cylindrical hole having an axis perpendicular to said second inclined surface.

3. A light diverting device according to claim 1, wherein said hole is a cylindrical hole having an axis parallel to the longitudinal axis of said second conductor means.

4. A light diverting device according to claim 1, wherein said third optical conductor means has a cross-sectional configuration which conforms to the cross-sectional configuration of said receiving-passage.

5. A light diverting device according to claim 4, wherein said third optical conductor means has an inclined surface which forms a continuation of the inclined surface of the second conductor means, said hole being a cylindrical hole having an axis perpendicular to the inclined surface of said third conductor means.

6. A light diverting device according to claim 4, wherein said third conductor means has a receiving-third conductor, said opening means further comprising a fifth optical conductor means disposed in said receiving-opening, said hole being formed in said fifth conductor means.

7. A light diverting device according to claim 6, wherein said receiving-opening and said fifth conductor means has a circular cross-sectional configuration.

8. A light diverting device according to claim 6, wherein said receiving-opening and said fifth conductor means has a rectangular cross-sectional configuration.

9. A light diverting device according to claim 4, wherein said third conductor means comprises a first section and a separate second section, each of said sections having hole-defining sections each forming a part of said hole.

10. A light diverting device comprising a first cylindrical optical conductor means having a longitudinal axis, said first conductor means having a transverse hole having a longitudinal axis which is disposed in a plane perpendicular to said longitudinal axis of said first conductor means, said transverse hole being partly defined by a first inclined surface which is inclined relative to the longitudinal axis of said first conductor means, a second optical conductor means having a longitudinal axis which is disposed perpendicular to the longitudinal axis of said first conductor means, said second conductor means having a light receiving edge which conforms to and engages the outer cylindrical surface of said first conductor means at a position opposite to said first inclined surface such that light energy transmitted through the first conductor is partially reflected by said first inclined surface into said second conductor means, the remaining of the light energy being transmitted through the first conductor means, and third light conductor means disposed in said transverse hole and having a second inclined surface engaging said first inclined surface, said third conductor means being slidably inserted in said transverse hole such that the amount that said first inclined surface is engaged by said second inclined surface is variable depending on the inserted position of said third conductor means in said transverse hole, whereby the amount of light energy transmitted to said second conductor means is thereby variable depending on the inserted position of said third conductor means in said transverse hole.

11. A light diverting device according to claim 10, wherein said third light conductor means has a triangular cross-sectional configuration conforming to the cross-sectional configuration of said transverse hole.

12. A light diverting device according to claim 10, wherein said third light conductor means comprises two separate members disposed within said transverse hole, said two members being longitudinallly slidable into and out of said transverse hole to provide different size spaces between the longitudinal ends of said two members, whereby the size of said space determines the amount of light energy transmitted to said second conductor means.

13. A light diverting device according to claim 10, wherein said third light conductor means comprises two separate members disposed within said transverse hole, at least one of said members having a cross-sectional configuration in the form of a parallelogram.

14. A light diverting device comprising a first cylindrical optical conductor means having a longitudinal axis, said first conductor means having a first light-emission end surface which is inclined relative to said longitudinal axis, a second cylindrical optical conductor means having a longitudinal axis axially aligned with the longitudinal axis of the first conductor means, said second conductor means having a second light-receiving end surface which is inclined relative to the longitudinal axis of said second conductor means, said first inclined surface engaging said second inclined surface, said second inclined surface having first opening means which define a first hole in said second inclined surface, a third optical conductor means having a longitudinal axis which is disposed perpendicular to the longitudinal axis of said first conductor means, said third conductor means having a light receiving edge which conforms to and engages the outer cylindrical surface of said first conductor means at a position opposite to said first hole such that light energy transmitted through the first conductor means is partially reflected by a first portion of said first inclined surface opposite to said first hole into said third conductor means, the remaining light energy transmitted through the first conductor means being transmitted through said second conductor means, fourth cylindrical optical conductor means having a longitudinal axis axially aligned with said first and second conductor means, said fourth conductor means having a third light emission end surface which is inclined relative to the longitudinal axis of said fourth conductor means, a fifth cylindrical optical conductor means having a longitudinal axis axially aligned with the longitudinal axis of the first, second and third conductor means, said fifth conductor means having a fourth light-receiving end surface which is inclined relative to the longitudinal axis of said fifth conductor means, said third inclined surface engaging said fourth inclined surface, said fourth inclined surface having second opening means which defines a second hole in said fourth inclined surface, a sixth optical conductor means having a longitudinal axis which is disposed perpendicular to the longitudinal axis of said fourth conductor means, said sixth conductor means having a light-receiving edge which conforms to and engages the outer cylindrical surface of said fourth conductor means at a position opposite to said second hole such that light energy is transmitted from said second conductor means to said fourth conductor means and is partially reflected by a first portion of said third inclined surface opposite to said second hole into said sixth conductor means, the remaining light energy transmitted through the fourth conductor means being transmitted through said fifth conductor means, said second hole being larger than said first hole so that approximately equal amounts of light intensity is transmitted into said third and sixth conductor means.

* * * * *